Jan. 31, 1967  D. W. DANIEL  3,300,833
SERRATED GEAR SHAVING TOOL
Filed Jan. 11, 1965  4 Sheets-Sheet 1
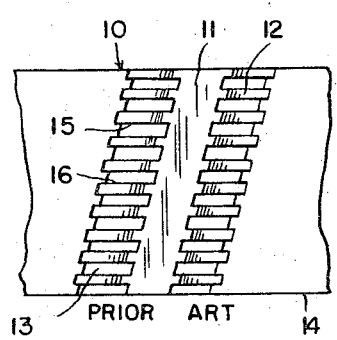
FIG.1.
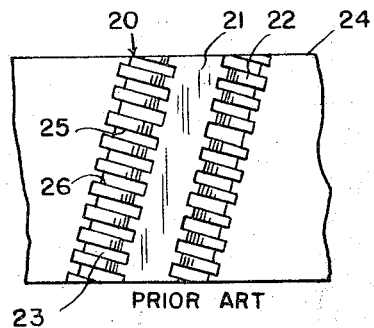
FIG.2.
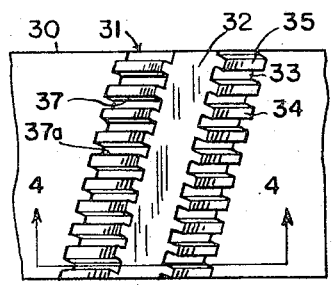
FIG.3.
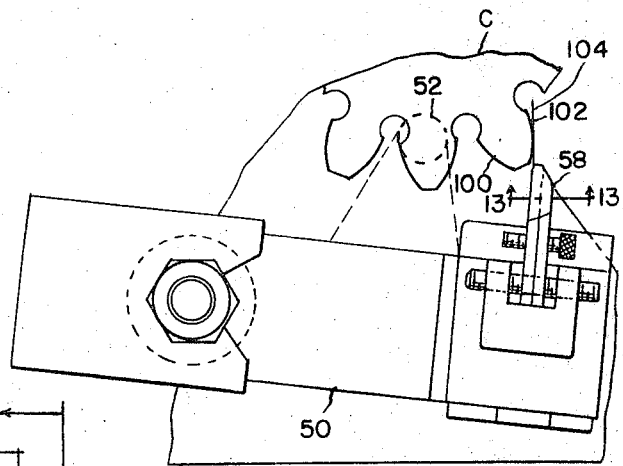
FIG.10.
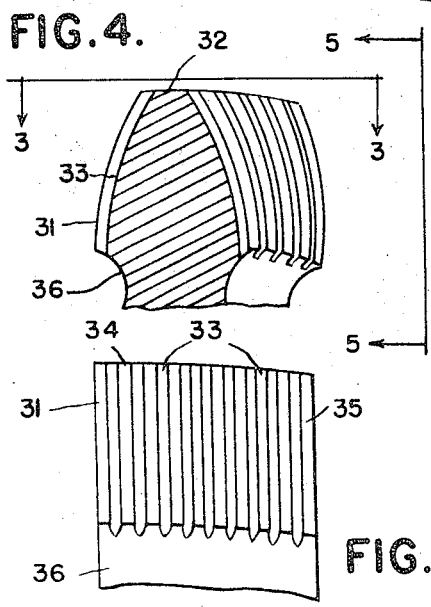
FIG.4.
FIG.5.
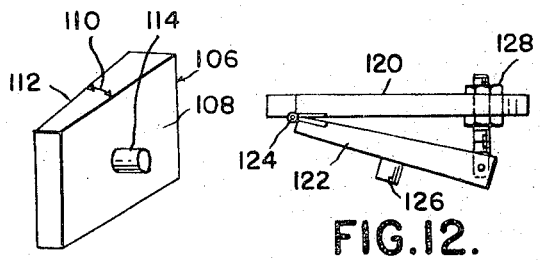
FIG.11.
FIG.12.
INVENTOR.
DAVID W DANIEL
BY Whittemore,
Hulbert & Belknap
ATTORNEYS

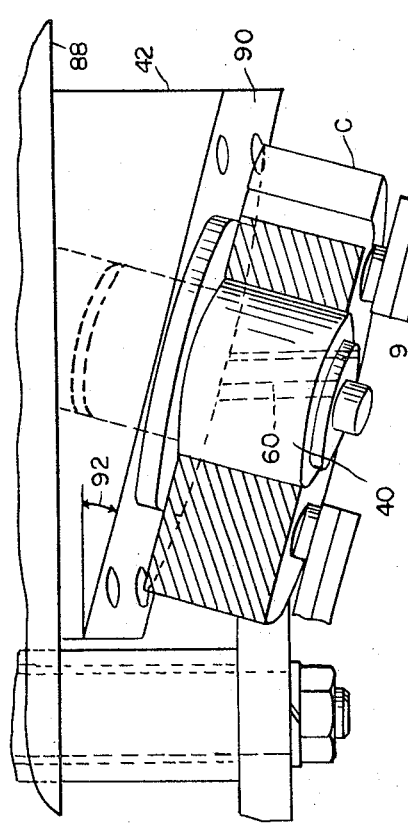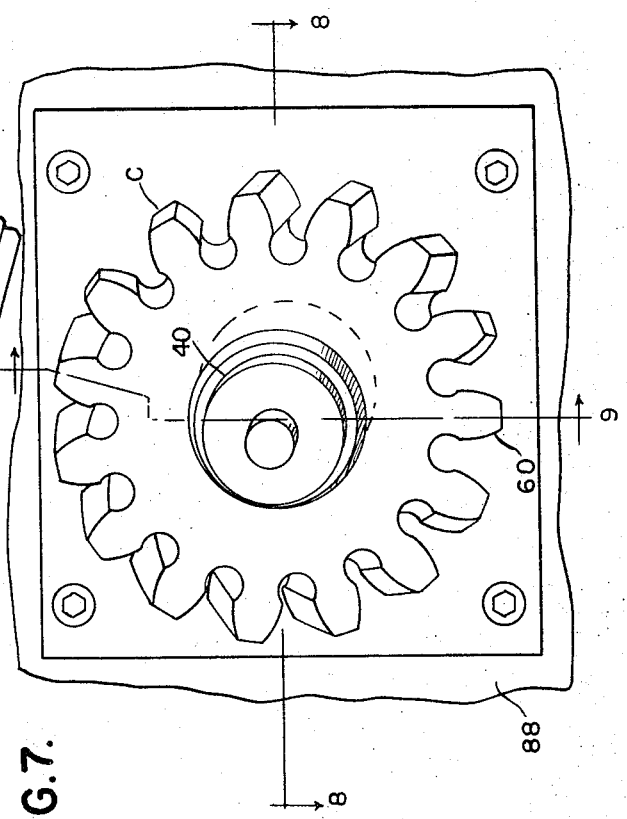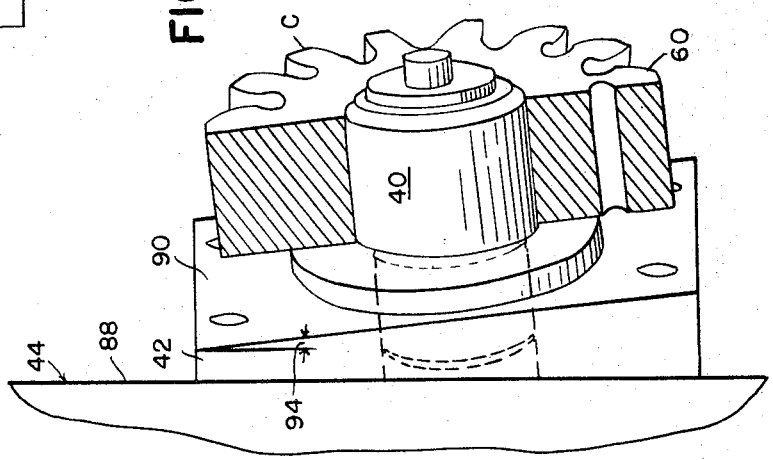

Jan. 31, 1967    D. W. DANIEL    3,300,833
SERRATED GEAR SHAVING TOOL

Filed Jan. 11, 1965    4 Sheets-Sheet 4

INVENTOR.
DAVID W. DANIEL
BY Whittemore,
Hulbert & Belknap
ATTORNEYS

United States Patent Office 3,300,833
Patented Jan. 31, 1967

3,300,833
SERRATED GEAR SHAVING TOOL
David W. Daniel, Birmingham, Mich., assignor to National Broach & Machine Company, Detroit, Mich., a corporation of Michigan
Filed Jan. 11, 1965, Ser. No. 424,623
7 Claims. (Cl. 29—103)

The present invention relates to a serrated gear shaving tool, and more particularly to one having serrations of a particular shape.

It is an object of the present invention to provide a gear shaving cutter in which serrations are provided by forming grooves in the flanks of the teeth of a gear-like body, the grooves extending in planes perpendicular to the axis of the body and having side surfaces which intersect the flank surfaces of the teeth of the gear-like body to form substantially equal included angles, which are of substantially 90 degrees, or slightly larger.

It is a further object of the present invention to provide a method of forming the gear shaving cutter described in the preceding paragraph which comprises oscillating a grooving tool in cutting strokes which occupy a reference plane and supporting the gear-like body inclined to the reference plane about a first axis parallel to the reference plane and further inclined about a second axis perpendicular to said first axis and parallel to the reference plane.

It is a further object of the present invention to provide a method of forming the gear shaving cutter described in the preceding paragraphs which comprises oscillating a grooving tool in cutting strokes which occupy a reference plane and supporting the gear-like body inclined to the reference plane about a first axis parallel to the reference plane and further inclined about a second axis perpendicular to said first axis and parallel to the reference plane, and providing a depth feed in a direction parallel to the plane of oscillation of the grooving tool.

Other objects and features of the invention will become apparent as the description proceeds, especially when taken in conjunction with the accompanying drawings, illustrating preferred embodiments of the invention, wherein:

FIGURES 1 and 2 are diagrammatic top views of serrated gear shaving cutter teeth constructed in accordance with the prior art.

FIGURE 3 is a top view of a serrated tooth of a gear shaving cutter constructed in accordance with the present invention.

FIGURE 4 is a sectional view on the line 4—4, FIGURE 3.

FIGURE 5 is a side elevational view as indicated by the arrows 5—5, FIGURE 4.

FIGURE 7 is a front elevational view illustrating the mounting of the gear-like cutter blank on the machine.

FIGURE 8 is a plan view of the structure shown in FIGURE 7, with parts in section on the line 8—8 thereof.

FIGURE 9 is a side elevational view of the structure shown in FIGURE 7, with parts in section on the line 9—9, FIGURE 7.

FIGURE 10 is a fragmentary front elevation of the machine shown in FIGURE 6, with a different setting which eliminates the compound angle block.

FIGURE 11 is a perspective view of a simplified angle block.

FIGURE 12 is a plan view of an adjustable angle support.

Figure 6:
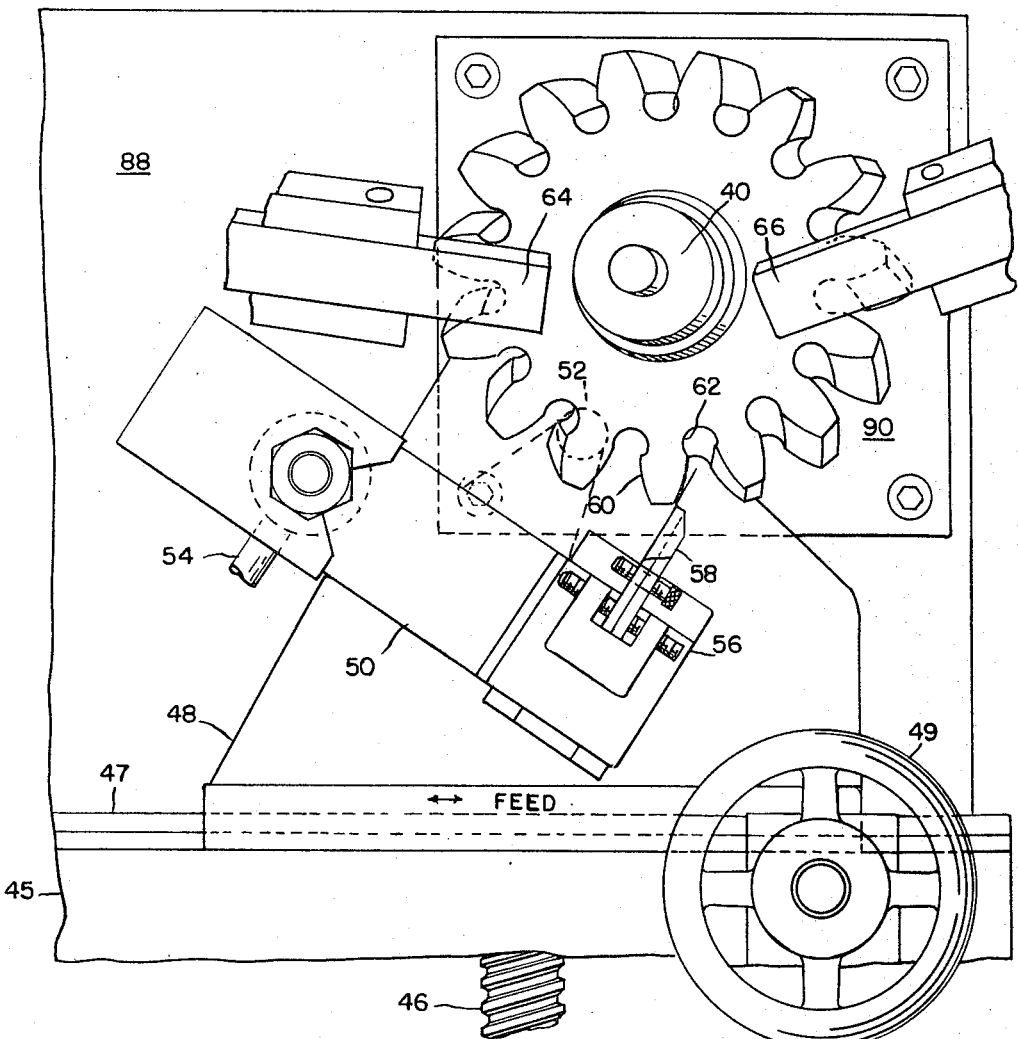
FIGURE 6 is a front elevational view of a machine for carrying out the improved method of serrating teeth.

Gear shaving cutters are generally formed from high speed tool steel and are in the form of spur or helical gears, the teeth of which are grooved or serrated to provide a series of parallel separated ribs the outer surfaces of which occupy the flanks of the teeth and the intersection between the sides of the ribs and the flank surfaces of the teeth constituting cutting edges.

According to one familiar form of gear shaving cutter as illustrated in FIGURE 1, there is shown a tooth 10 having a top surface 11 and side surfaces 12, the side surfaces being interrupted by grooves 13. As will be apparent from an inspection of FIGURE 1, the side surfaces of the grooves 13 are parallel to the side surfaces 14 of the tool. Inasmuch as the tooth 11 as seen in FIGURE 1, is a helical tooth, it will of course be apparent that this construction results in the formation of ribs having cutting edges 15 which have an acute included angle, and cutting edges 16 which have obtuse included angles.

In FIGURE 2 there is shown another known form of serrated tooth 20 having a top surface 21 and side or flank surfaces 22. The flanks of the teeth are grooved as indicated at 23 and it will be observed that the side surfaces of the grooves are parallel to each other but are inclined with respect to the side surfaces 24 of the gear body. In this construction the side surfaces of the grooves 23 extend generally perpendicular to the length of the tooth 20 and hence, define cutting edges 25 and 26 both of which have included angles of substantially 90 degrees. The grooves 23 however, extend obliquely with respect to the side surfaces 24 of the teeth and this leads to an undesirable condition in that at the ends of the teeth some of the grooves run out between the top and root of the teeth.

In FIGURES 3–5 there is illustrated the most desirable form of serrated tooth. In general, this tooth has the desirable feature of providing the grooves, and hence the ribs, in parallelism to the side surfaces of the teeth and at the same time, the ribs are provided at both sides thereof with cutting edges having an included angle of substantially 90 degrees.

In these figures there is illustrated at 30 a portion of the cutter having a plurality of helical teeth 31 each tooth having a top surface 32 and a plurality of grooves 30, each adjacent pair of grooves defining between them a laterally outstanding rib 34. The side surfaces of the ribs and grooves are inclined in such a way as to intersect the side surfaces 35 of each tooth 31 so as to provide cutting edges 37 and 37a, both of which have included angles of substantially 90 degrees. Each tooth is provided with an undercut channel 36.

Figure 14:
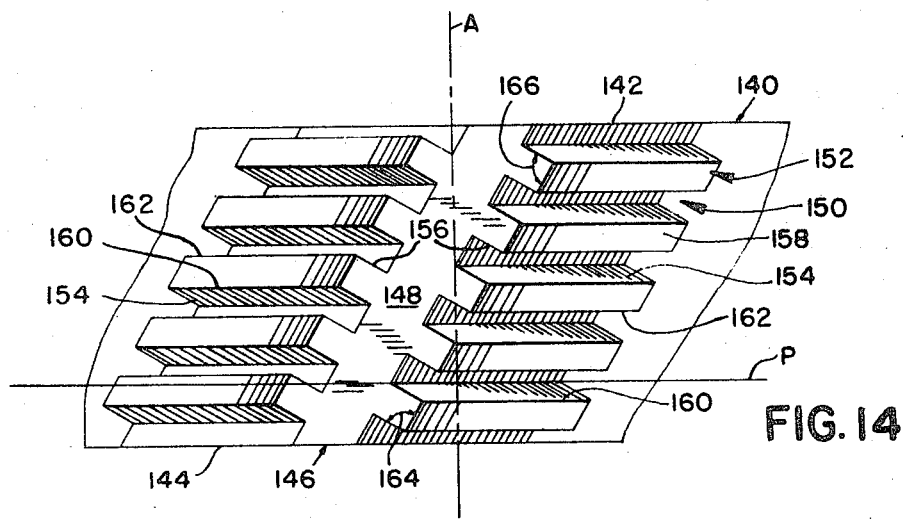
FIGURES 14 and 15 are fragmentary enlarged views illustrating two different arrangements of shaving ribs on teeth of gear shaving cutters.
Figure 15:
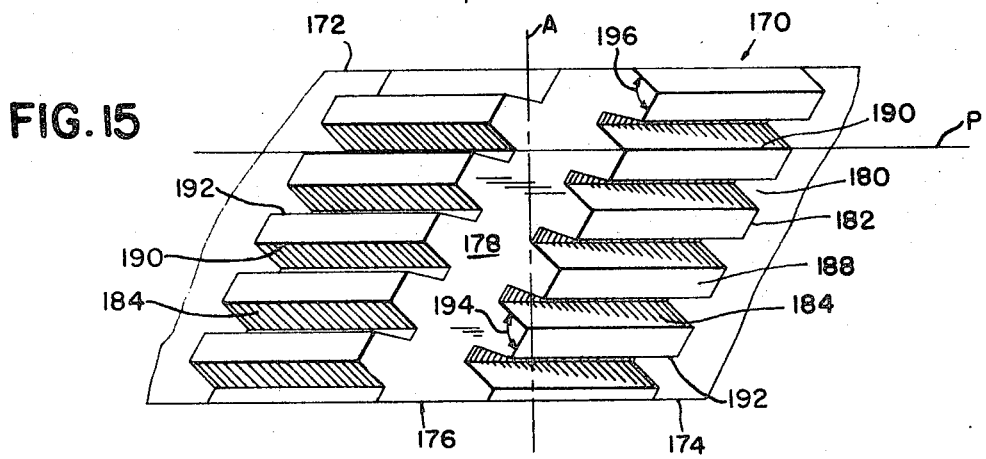

A more detailed showing of the construction of the shaving cutter is seen in FIGURES 14 and 15. These views represent an enlarged view of a cutter looking in the direction of the edge of the cutter and showing a single tooth located in line with the axis A thereof.

Referring first to FIGURE 14, the cutter 140 has opposite flat sides 142 and 144 and a plurality of generally helically disposed teeth one of which is illustrated at 146. The tooth 146 has a top or crest surface 148 and is provided at opposite sides with a plurality of grooves 150 alternated with the ribs 152. The ribs 152 have side surfaces 154 and 156 which intersect the flank of the tooth leaving the ribs with surfaces 158 which form cutting edges 160 and 162 each being formed by the intersection between a side surface 154 or 156 of a rib 152 and the top surface 158 thereof.

It will be observed that the surafaces 154 and 156 are at the opposite side of grooves, and surfaces 156 do not appear in FIGURE 14, but which are undercut as a result of the disposition of the grooves 150 and ribs 152. This relationship exists with helical teeth whenever the grooves 150 are disposed so as to form with the crest or top surfaces of the ribs included angles of substantially 90 degrees. It will further be observed that the ribs 152 all extend substantially in planes perpendicular to the axis of the gear. In other words, the ribs 152 occupy planes of rotation. The trace of one such plane is seen at P, the plane being perpendicular to the plane of the figure.

In the embodiment of the invention illustrated in FIGURE 14, it will be observed that the side walls 154 and 156 of the grooves 150 are substantially parallel to each other and to the side walls of the grooves which are hidden, and that all of the cutting edges which are formed by the intersection of the side and top surfaces of each rib have included angles which are substantially 90 degrees. These included angles are designated 164 and 166 in FIGURE 14. Accordingly, the construction involves a helical gear having teeth the flanks of which are provided with a series of parallel grooves each of which extends substantially in a plane perpendicular to the axis A of the gear, all of the side walls of the grooves being equally inclined to the flank surfaces 158 and disposed to define with the flank surfaces equal included angles of substantially 90 degrees.

Referring now to FIGURE 15 there is illustrated a second embodiment of the present invention which differs from that shown in FIGURE 14 only in that the opposite side walls of the grooves are inclined with respect to each other so that they diverge outwardly and form with the flank surfaces of the teeth (the top surfaces of the individual ribs thereon) substantially equal included angles which are slightly greater than 90 degrees. As seen in this figure, the gear 170 has opposite side surfaces 172 and 174 and helical teeth one of which is indicated in its entirety at 176. The tooth 176 has a top or crest surface 178 and is provided at its opposite flanks with a plurality of parallel grooves 180. The provision of the grooves 180 leaves a corresponding group of parallel ribs 182 at opposite sides of the teeth, these ribs having side surfaces 184 and 185, of which the surfaces 184 are visible in FIGURE 15. The side surfaces 185 are concealed at the hidden side of ribs 182. It will be apparent that the surfaces 185 are undercut surfaces. This condition exists at one side of each rib whenever the equal included angles at the cutting edges thereof exceed 90 degrees by an amount which is less than the helix angle of the cutter. Thus for example, if the helix angle of the cutter is 30 degrees and if the equal included angles at cutting edges formed by the ribs thereon were 120 degrees, then neither of the side surfaces of the ribs or grooves would be undercut and there would be no particular difficulty in machining the grooves or serrations into the teeth with conventional equipment familiar in the art. However, when the equal obtuse included angle cutting edges are as great as 120 degrees, an undesirable condition results since the relative area occupied by ribs and by the spaces or grooves between the ribs changes quite rapidly as the cutter is resharpened. In accordance with the present invention it is desired to produce included angle cutting edges of not less than 90 degrees and preferably having a value between 100 and 110 degrees. 105 degrees is considered to be an excellent angle giving rise to superior shaving operations over anything known in the prior art.

The top surfaces 188 of the ribs intersect the side surfaces 184 and 185 thereof to form cutting edges 190 and 192 respectively. The side surfaces 184 and 185 of the ribs converge outwardly so that the included angle at the cutting edge formed by the intersection of the top surfaces 188 and the side surfaces 184 and 185 are equal included angles of slightly more than 90 degrees.

As in the embodiment of the invention illustrated in FIGURE 14, it will be observed that all of the ribs and grooves extend in planes perpendicular to the axis A of the tool and hence occupy planes of rotation thereof. One such plane is indicated at P.

The obtuse substantially equal included angles are indicated at 194 and 196 at the sides of the ribs including the side surfaces 184 and 185 respectively. The included angles between the crests 188 of the ribs and the sides 185 thereof present an undercut situation only when the included angle at these cutting edges exceeds 90 degrees (if at all) by an angle which is less than the helix angle of the cutter. It will thus be seen that the construction of the embodiment illustrated in FIGURE 15 is a gear shaving cutter in the form of a helical gear having teeth the flanks of which are provided with a series of parallel grooves each of which extends substantially in a plane perpendicular to the axis of the gear, the side walls 184 and 185 of the grooves being substantially equally inclined to the flank surfaces and diverging outwardly to define with the flank surfaces substantially equal included angles of slightly more than 90 degrees, which included angles exceed 90 degrees by an angle less than the helix angle of the cutter.

Figure 16:
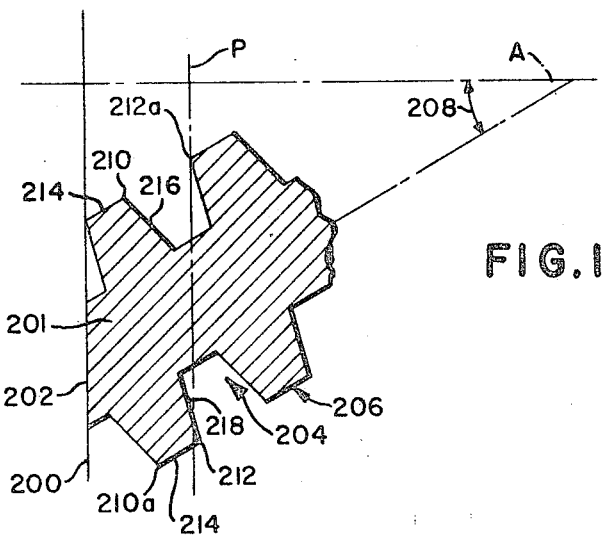
FIGURE 16 is an enlarged diagrammatic sectional view through an end portion of a cutter tooth.

In FIGURE 16 there is illustrated diagrammatically the relationship of cutting edges and side surfaces of the grooves and ribs in a particular embodiment of the invention in which the gear shaving cutter has a helix angle of 30 degrees and in which the included angles at the cutting edges at both sides of all ribs are 105 degrees. This figure may be considered as a section through an end portion of a tooth cut by a plane which is parallel to the axis of the cutter and spaced radially outwardly from the axis a distance sufficient to intersect an intermediate portion of a tooth. In the figure one end surface of the gear and of the teeth thereon is rotated at 200, the end surface of a tooth 201 being specifically designated 202. As previously described, the flanks of the teeth are interrupted by grooves 204 cut into the flanks and leaving ribs 206 intermediate adjacent grooves. It will be understood that the crests of the ribs 206 occupy the original helicoidal involute surface of the cutter tooth.

The grooves 204 and the ribs 206 are disposed to extend in parallelism with planes perpendicular to the axis of the gear-like cutter. In this figure the dot and dash line A indicates the direction of the axis of the cutter and it will of course be apparent that this line extends perpendicularly to the end surfaces 200 and 202 of the cutter and cutter teeth respectively.

Inasmuch as the cutter illustrated in FIGURE 16 is said to have a 30-degrees helix angle, it will be appreciated that the angle 208 is a 30-degrees angle. It will also be recalled that the cutting edges 210 and 212 have included angles of 105 degrees. It will be understood that the cutting edges 210 are defined by the intersection between the crest 214 of each rib and a side wall 216 of the groove 204, the side wall 216 being the side wall which is not undercut with reference to planes of rotation or planes perpendicular to the axis A, one of such planes being indicated at P. The cutting edge 212 is produced by the intersection between the crest 214 of a rib 206 and the side wall 218 of the groove 204. It will be apparent from the foregoing that the side walls 218 of the grooves are undercut with reference to planes of rotation such as the plane P.

It is to be understood that the cutting edges 210 and 212 each occupies a single plane of rotation. In this plane of rotation the cutting edge, since it is formed by the intersection of two surfaces, one of which is the original flank of the tooth, has an involute shape.

With this arrangement, when the cutter is rotated in tight mesh with a work gear with the axes of the gear and cutter crossed, the component of relative sliding between the teeth of the gear and cutter which takes place as a result of the crossed axes setting and which is longitudinal from end to end of the teeth, presents cutting edges at both sides of each tooth which are substantially equal and preferably obtuse. In the embodiment illustrated in FIGURE 16, it will be observed that the cutting edges 210 and 212 are capable of simultaneous cutting during rotation of the cutter in one direction, while the cutting edges designated 210a and 212a are arranged for simultaneous cutting when rotation is in the opposite direction.

In forming serrated teeth it is usual to provide a blade-like grooving tool preferably having a plurality of ribs thereon each of which provides a cutting edge at the end of the blade. The blade is oscillated back and forth so that the cutting edges move in a plane and also follow a path therein which is substantially involute in character. It is known that each involute closely approximates an arc of a particular radius, and for the purpose of forming serrations in the teeth of a gear shaving cutter, it is usual to cause the cutting edges of the grooving blade to move in the arc which most closely approximates the involute surface of the teeth.

The undercut channel 36 serves among other things to provide a clearance space into which the cutting edges of the serrating blades move upon completion of a cutting stroke. In other words, the cutting stroke is from crest to root of the teeth of the gear shaving cutter and such cutting stroke terminates in the channel 36.

The gear shaving cutter shown in FIGURE 1 is produced by oscillating the ribbed serrating tool in an approximately involute path in a plane coincident with the plane of the gear. The gear shaving cutter shown in FIGURE 2 is produced by oscillating the ribbed serrating blade in a plane oblique to the plane of the gear and forming an angle there-with approximately equal to the helix angle of the gear. The axis about which the serrating blade is rocked or oscillated is substantially parallel to the length of the particular tooth being serrated.

In order to produce the improved gear shaving cutter having teeth of the form shown in FIGURE 3, a different arrangement is necessary and this arrangement is illustrated in FIGURE 6. In this figure the gear shaving cutter is designated C and is mounted for rotation on an arbor 40 extending outwardly from an angle block 42 mounted on the machine. The angle block is arranged to provide for a particular angularity of the arbor 40 with reference to the plane of oscillation of the serrating blade as will subsequently be described in detail.

First however, it will be observed that the serrating machine comprises a main frame 44 provided with a table 45 vertically adjustable by means including a feed screw 46, the table having ways 47 on which a slide 48 is mounted for feeding movement from left to right by means including a hand wheel 49, as seen in the figure. Mounted on the slide 48 is a rocking arm 50 having a pivot support 52 and including means 54 for oscillating the arm 50 back and forth about its pivot support 52. At the right end of the arm 50 as viewed in FIGURE 6, there is provided an adjustable holder 56 for supporting the serrating blade 58. The axis of the pivot support 52 is located at the center of an arc which approximates the involute surface of the tooth 60 of the cutter C. The amplitude of oscillation or rocking movement of the arm 50 is such as to cause the cutting edges of ribs provided on the blade 58 to move from a position of clearance just below the crest of the tooth 60 to a position within the undercut channel 62. The blade 58 which preferably has a width approximately equal to the length of the tooth 60 from end to end thereof, is mounted so that the cutting edges occupy a plane at the end of the blade perpendicular to the arm 50 as illustrated in the figure.

The cutter C is clamped in adjusted position for each serrating operation by a pair of clamp elements 64 and 66. When the clamps are released the gear is indexed to a new position and reclamped. Thereafter, oscillation of the arm 50 carries the serrating blade 58 in its serrating strokes and depth feed is accomplished by moving the slide 48 to the left as seen in FIGURE 6 until the ribs on the blade 58 have cut the grooves in the tooth surface of the cutter C to the required depth.

It will be observed in FIGURE 6 that the cutter C is mounted at a skew angle. The exact angularity will be more apparent from an inspection of FIGURES 7–9. First however, it is to be observed that the axis of pivot mounting 52 of the arm 50 is perpendicular to the plane of the figure and this plane of oscillation in which the arcuate path of movement of the cutting edges of the serrating blade 58 is the reference plane with respect to which the skewed position of the cutter C will be described.

FIGURES 7–9 illustrate the frame 44 of the serrating machine as including a vertical locator surface 88 which is parallel to the reference plane of oscillation of the serrating tool. The arbor 40 is located on an angle block 42 having its front surface 90 skewed with reference to the vertical surface 88 of the machine.

The present invention as previously indicated, is limited to serrations provided on a helical gear. The surface 90 of the block 42 is so inclined that the tooth 60 positioned for engagement with the serrating blade 58 extends perpendicular to the reference plane of oscillation of the blade. This relationship is clearly illustrated in FIGURE 6. For this purpose the surface 90 is inclined as shown in FIGURE 8 to form an angle 92 which is approximately equal to the helix angle of the cutter C. The cutter shown in FIGURES 7–9 has teeth which extend at a left hand helix. If it is assumed that the helix angle of the cutter teeth is 15 degrees, then it will be appreciated that the angle 92 is approximately 15 degrees. This will cause the tooth 60 at the bottom of the cutter C to extend substantially perpendicular to the plane of oscillation of the serrating blade.

This however, is not sufficient to produce serrations of the type illustrated in FIGURE 3. For this purpose it is necessary to further incline the surface 90 about an axis extending at 90 degrees to the axis of inclination which establishes the angle 92. Specifically, this is accomplished by causing the surface 90 to define an angle 94 with respect to a vertical plane.

In other words, the surface 90 may be considered as developed by first inclining a vertical plane about a vertical axis through the angle 92 to compensate for the helix angle of the gear, and thereafter inclining the surface 90 about a horizontal axis parallel to the surface 88 to produce the angle 94. With this arrangement oscillation of the serrating blade 58 will produce grooves 33 the sides of which are parallel to each other and intersect the surfaces 34 of the teeth to define 90 degrees included angle cutting edges and in which the grooves 33 extend substantially parallel to the side surface 30 of the cutter, or the end elements of the tooth flanks.

Referring now to FIGURE 10 there is illustrated a modification of the apparatus for grooving the teeth of the cutter. This modification results in the elimination of the necessity for using a compound angle block 42, as will now be described.

Referring again to FIGURE 6, it will be observed that the tooth 60 at the bottom of the cutter C whose surface is being grooved or serrated by the tool 58, has an involute side surface which extends generally upwardly and somewhat to the right of its top corner adjacent to the tool 58. Since the cutter is inclined about a vertical axis by an amount generally equivalent to its helix angle, this upward inclination of the surface of the tooth which is being serrated would not extend in substantial parallelism to the sides of the teeth except for the compound angle introduced by the angle 94 in the block 42.

However, it is possible to position the cutter C in such a way that the compound angle 94 of the block 42 is not required. With this arrangement the cutter C is supported in a position in which it is disposed to the plane of the surface 88 in a position resulting from swivelling the cutter out of parallelism with the surface 88 about a vertical axis passing through the axis of the cutter by an angle approximately equal to the helix angle of the cutter and in a direction to cause the teeth adjacent the bottom of the cuter to extend substantially perpendicular to the plane of the surface 88. In addition, the cutter is supported for operation in a position such that a tooth 100 thereof has its side surface 102 positioned to extend as nearly as possible vertically. This position is accomplished when a plane 104 tangent to the mid-point of the involute profile of the tooth extends substantially vertically. It will of course be apparent that the cutter C can be positioned as above described by the use of a single angle block such as illustrated at 106 in FIGURE 11. This angle block has its front surface 108 disposed at an angle 110 with respect to its rear surface 112, this angle being approximately equal to the helix angle of the cutter. The front surface 108 includes a pivot support mounting 114 which of course extends perpendicular to the surface 108 of the block 106.

The simple angle block 106 described in FIGURE 11 may of course be replaced by an adjustable structure as shown in FIGURE 14. In this case a mounting plate 120 is secured to the plane surface 88 of the machine and includes a swivelled support plate 122 hinged as indicated at 124 to the mounting plate 120. The pivoted or swivelled support plate 122 includes a pivot mounting 126 and suitable means indicated generally at 128 are provided for adjusting the angularity of the support plate 122 with respect to the mounting plate 120.

With either of the mounting structures indicated in FIGURE 11 or 12 provided, the cutter may be adjusted to the position indicated in FIGURE 10, its angular position being determinable by appropriate adjustment on the arbor 40. Thereafter, the pivot mounting 52 of the arm 50 may be adjusted by downward movement of the table 45 and movement to the right of the slide 48 to position the pivot 52 so that the serrating blade 58 is in position to operate on the illustrated surface 102 of the tooth 100. Thereafter, the serrating operation is carried out by oscillating the arm 50 about its pivot 52 while feeding the slide 48 to the left on the ways 47 to cut the grooves to the required depth.

Figure 13:
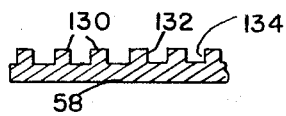
FIGURE 13 is a fragmentary sectional view through a serrating blade, taken on the line 13—13, FIGURE 10.

The serrating or grooving blade 58 may have a cross-section as illustrated in FIGURE 13 where it will be observed that the blade includes cutting ribs 130 which in this figure are shown as provided with parallel opposite sides 132 and 134.

It will of course be apparent that the grooving operation as above described permits the formation of grooves which extend up and down the flanks of the teeth of the cutter in parallelism with the side surfaces of the cutter. In addition, employing a serrating blade having cutting ribs 130 of the shape indicated in FIGURE 13, this operation will produce grooves in the flanks of the cutter teeth which form cutting edges in the side surface of the cutter tooth having included angles of substantially 90 degrees. The direction of feed is perpendicular to the plane of the serrating blade and hence, the grooves or serrations are formed without interference.

While in the foregoing, reference has been made to the production of a cutter having cutting edges all of which are of approximately 90 degrees included angle, it will be appreciated that if desired the ribs 130 on the serrating blade may be slightly tapered in cross-section with the result that the cutting edges provided on the cutter C may be slightly greater than 90 degrees. In any case however, the present invention is characterized by the provision of cutting edges on the flanks of the teeth of the cutter C all of which are substantially equal and which may be approximately 90 degrees or greater.

The drawings and the foregoing specification constitute a description of the improved serrated gear shaving tool in such full, clear, concise and exact terms as to enable any person skilled in the art to practice the invention, the scope of which is indicated by the appended claims.

What I claim as my invention is:

1. A gear shaving cutter adapted to cut substantially equally at opposite sides of its teeth when rotated in one direction in tight mesh with a work gear at crossed axes therewith, said cutter being in the form of a helical gear having teeth the flanks of which are provided with a plurality of parallel grooves, the side walls of said grooves intersecting the flank surfaces of said teeth to form sharp cutting edges, each groove extending longitudinally in a direction such that the cutting edges formed by the intersection of its side walls with the flanks of the teeth extend in planes of rotation of the cutter perpendicular to its axis, the side walls of said grooves being disposed such that all of the cutting edges, both at opposite sides of said teeth have substantially equal included angles of not less grooves and at opposite sides of said teeth have substantially equal included angles of not less than 90 degrees.

2. A gear shaving cutter as defined in claim 1 in which the included angles are obtuse.

3. A gear shaving cutter as defined in claim 1 in which the included angles are between 100 degrees and 110 degrees.

4. A gear shaving cutter as defined in claim 1 in which the included angles are about 105 degrees.

5. A gear shaving cutter as defined in claim 2 in which the included angles of the cutting edges exceed 90 degrees by an angle less than the helix angle of the cutter.

6. A gear shaving cutter as defined in claim 3 in which the helix angle of the cutter exceeds 20 degrees.

7. A gear shaving cutter as defined in claim 4 in which the helix angle of the cutter exceeds 15 degrees.

References Cited by the Examiner

UNITED STATES PATENTS

| | | | |
|---|---|---|---|
| 2,172,545 | 9/1939 | Praey | 76—101 |
| 2,278,737 | 4/1942 | Praeg. | |
| 2,545,393 | 3/1951 | Tackett | 90—24 |
| 2,667,090 | 1/1954 | Martin | 76—101 |
| 2,738,569 | 3/1956 | Praey | 29—103 |
| 2,750,852 | 6/1956 | Selvajgis | 90—24 |
| 2,909,831 | 10/1959 | Gates | 29—103 |

WILLIAM W. DYER, Jr., *Primary Examiner.*

HARRISON L. HINSON, *Examiner.*

UNITED STATES PATENT OFFICE
CERTIFICATE OF CORRECTION

Patent No. 3,300,833        Dated January 31, 1967

Inventor(s) David W. Daniel

It is certified that error appears in the above-identified patent and that said Letters Patent are hereby corrected as shown below:

Claim 1, last three lines should read:

"teeth have substantially equal included angles of not less than 90 degrees."

Signed and sealed this 1st day of October 1974.

(SEAL)
Attest:

McCOY M. GIBSON JR.
Attesting Officer

C. MARSHALL DANN
Commissioner of Patents